Figure 1:
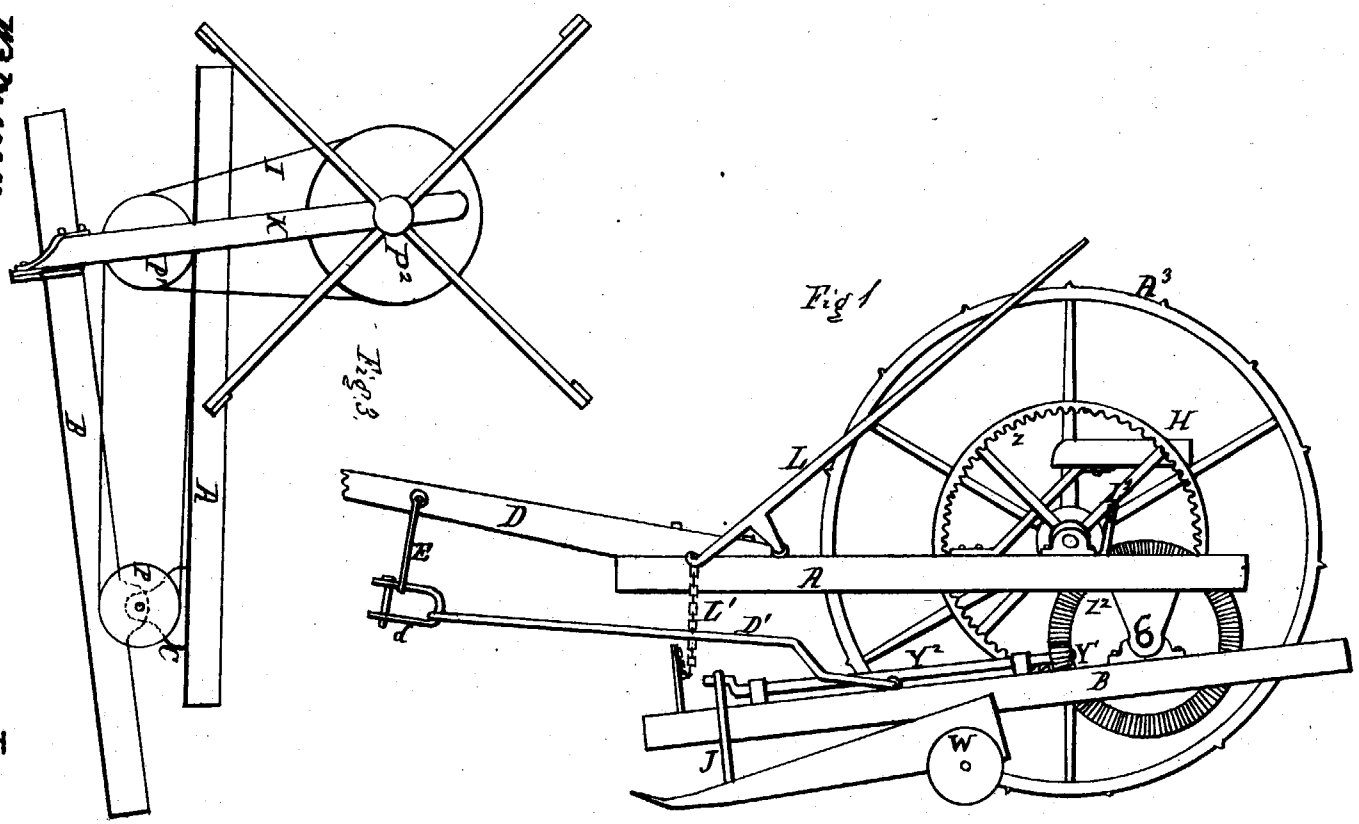

3 Sheets--Sheet 1.

T. N. FOSTER.

Harvesters.

No. 5,606. Reissued Oct. 14, 1873.

Witnesses

A. M. Smith

Aley Mahon

Inventor

H. H. Doubleday

Agent of Thomas N. Foster

A.M. PHOTO-LITHOGRAPHIC CO. N.Y. (OSBORNE'S PROCESS)

3 Sheets--Sheet 2.

T. N. FOSTER.

Harvesters.

No. 5,606. Reissued Oct. 14, 1873.

Inventor

John Williams
Edwin J. McSain
Witnesses

H H Doubleday
Assignee of Thomas N Foster

A.M. PHOTO-LITHOGRAPHIC Co. N.Y. (OSBORNE'S PROCESS)

3 Sheets--Sheet 3.

T. N. FOSTER.

Harvesters.

No. 5,606. Reissued Oct. 14, 1873.

Witnesses

John Williams

Edwin J. McLean.

Inventor

H. H. Doubleday assignee of Thomas N. Foster

AM. PHOTO-LITHOGRAPHIC Co. N.Y. (OSBORNE'S PROCESS)

UNITED STATES PATENT OFFICE.

THOMAS N. FOSTER, OF SOUTH PASS, ILLINOIS, ASSIGNOR TO HENRY H. DOUBLEDAY.

IMPROVEMENT IN HARVESTERS.

Specification forming part of Letters Patent No. 30,215, dated October 2, 1860; reissue No. 5,606, dated October 14, 1873; application filed March 16, 1872.

DIVISION A.

*To all whom it may concern:*

Be it known that I, THOMAS N. FOSTER, of South Pass, county of Union, State of Illinois, formerly of Watertown, county of Jefferson, State of New York, have invented certain new and useful Improvements in Harvesters for Grain, Grass, &c.; and I do hereby declare that the same is described and represented in the following specification and drawings.

To enable others skilled in the art to make and use my improvements, I will proceed to describe their construction and operation, referring to the drawings, in which the same letters indicate like parts in each of the figures.

Figure 2:
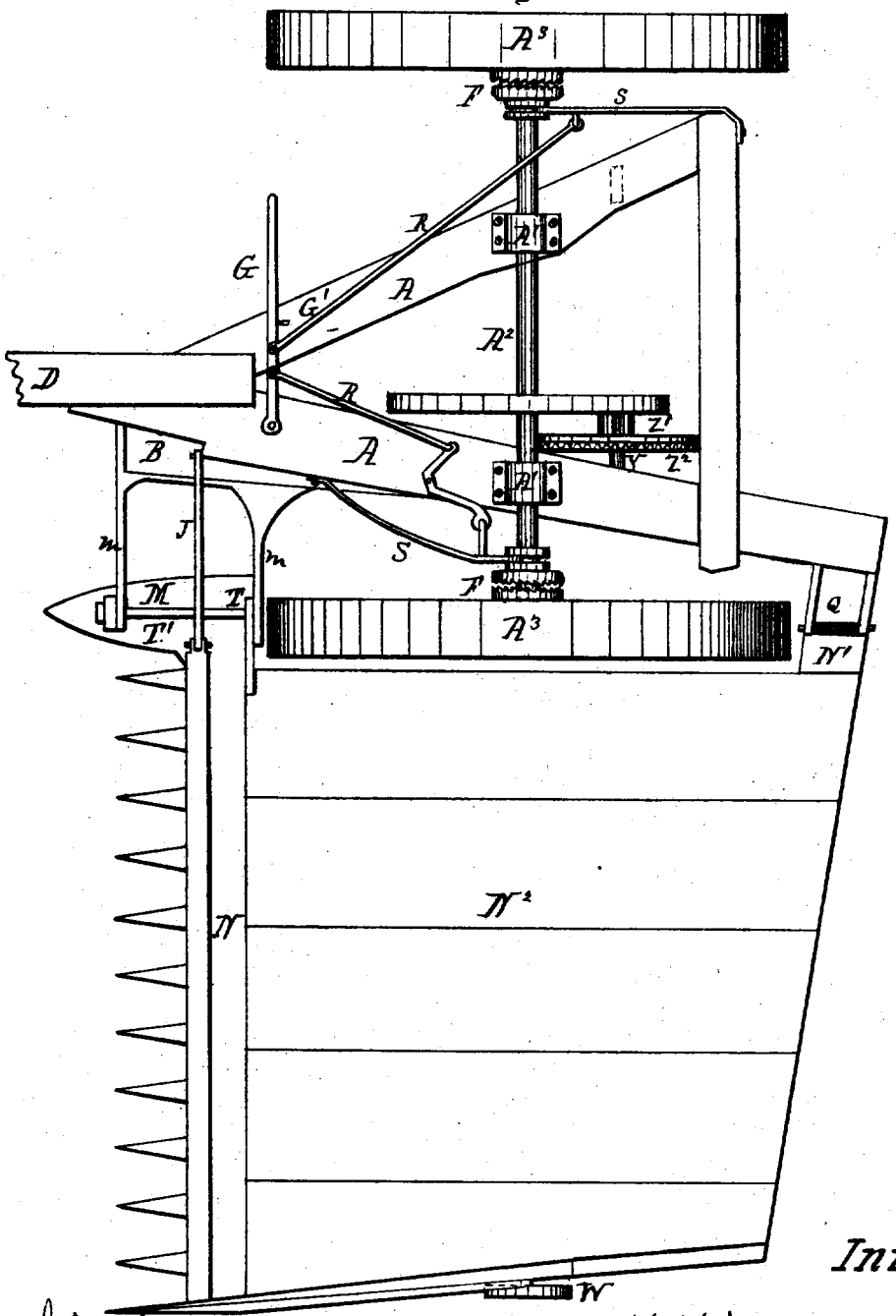
Figure 5:
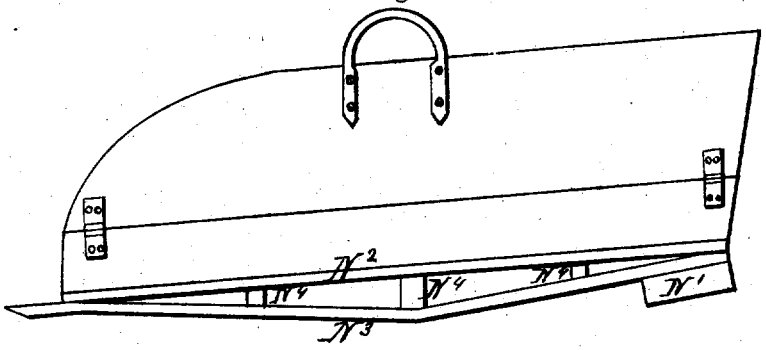
Figure 4:
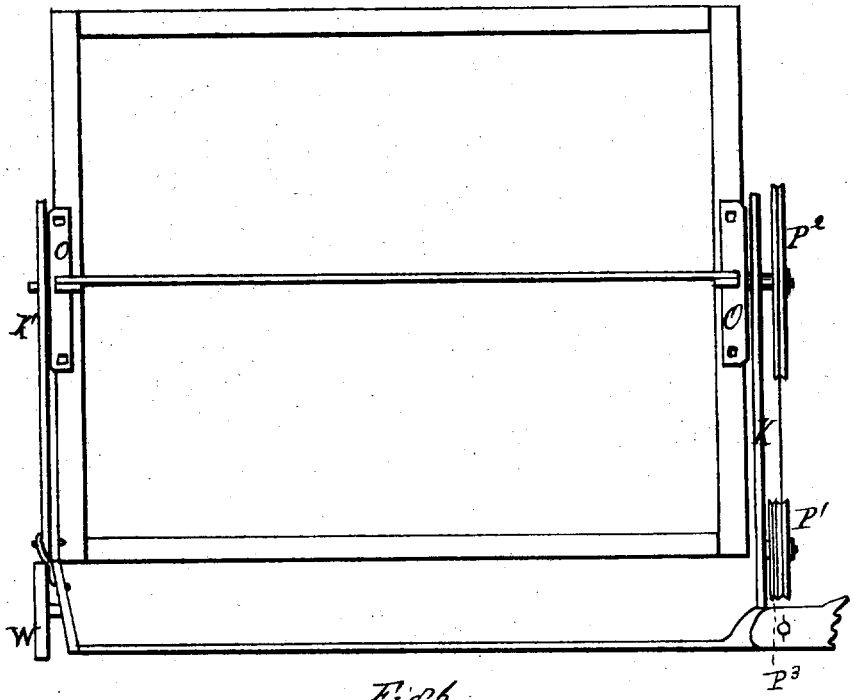

Figure 1 is an elevation of one side of my inchine. Fig. 2 is a plan or top view. Fig. 3 is an elevation of the pulleys for the reel. Fig. 4 is a side elevation of the reel. Fig. 5 is a cross-section of the platform; and Fig. 6 is a cross-section, showing the connection of the frames A and B.

The invention consists in combining with a rigid tongue-frame and a vibrating cutter-frame a flexible draft-rod or chain connection between the vibrating frame and the whiffletrees, for the purpose of lifting the cutters by means of the direct draft of the horses without disturbing the relation between the tongue and the tongue-frame.

In the drawings, A A represent the main or tongue frame, to which the boxes $A^1$ $A^1$ are fastened for the axle $A^2$ to turn in, as shown in Fig. 2. The carrying and driving wheels $A^3$ are fitted to turn freely on the ends of the axle $A^2$, and both of them provided with clutches to correspond with clutches F F, which slide on the axle over a feather, so arranged as to lock the wheels to the axle, and turn it to drive the cutting apparatus, as will be hereinafter described. The springs S S, fastened to the frame A, are fitted to grooves in the clutches F F, so as to press them out and lock the wheels to the shaft or axle. The links R R are connected to the springs S S and to the lever G, so that when the lever is pulled out and placed before the stud G′ the clutches are drawn from the wheels, so that they turn freely on the axle, while the axle ceases to turn until the lever G is raised, so as to allow the springs to throw the clutches against the wheels and lock them to the axle again. D is a tongue or pole rigidly secured to the main or tongue frame. B is a vibrating frame similar to the first, and is placed right below it, and the two frames are connected by hinges C C′, Figs. 1 and 6, so that the lower frame B, which carries the cutting apparatus, can vibrate and allow the cutting apparatus to follow the undulations of the ground. The lever L is pivoted to the main or tongue frame A, and is connected by a chain, $L^1$, to the front end of vibrating frame B, so as to raise it and hold it up by depressing lever L and placing under a hook, $L^2$, in frame A. D′ is a link, fastened to the frame B, and suspended at its front end from pole D by link E. Link $D^1$ is provided with a clevis, *d*, Fig. 1, to which the whiffletrees are attached. Thus it will be seen that the draft of the horses is applied to the front part of the vibrating frame, and tends to lift the free end of said frame from the ground. N is the finger-bar, and M is the finger-bar shoe. *m m* are ears or arms secured to the inner side of the front end of the vibrating or cutter frame B. The shoe M is pivoted to arms *m m*, its position being in front of the inner wheel $A^3$, the object of this arrangement of the shoe being to provide a support for the reel-post, (when the machine is used as a reaper,) in such position that the devices for driving the grain-gathering mechanism may be conveniently arranged and properly operated.

Figure 6:
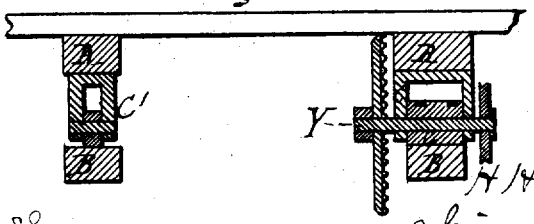

To operate the cutter-bar and cutters the annular gear Z is fastened to the axle $A^2$ and turns the pinion $Z^1$ on the secondary shaft Y, which shaft is mounted in the hinge C, as shown in Figs. 1 and 6. The gear $Z^2$ turns the pinion $Y^1$ and crank-shaft $Y^2$, which turns in boxes fastened on the frame B, the crank being connected with the cutter-bar by the pitman J.

By an inspection of the drawings it will be seen that the pinion-shaft Y forms the pivot of hinge C, and that said shaft and the pivot of hinge C′, shown in dotted lines in Fig. 2, are in a plane parallel with the main axle $A^2$, and that the cutter-frame B can vibrate freely about shaft Y as a center without disturbing a proper working relation of the driving-gear.

By the employment of the flexible chain-connection $L^1$ I can suspend the cutter-frame B at any desired height from the ground, and yet if one of the carrying-wheels should drop into a depression in the ground the chain will allow the said cutter-frame to rise without straining any part of the mechanism.

H is the driver's seat, mounted on the tongue-frame, substantially as shown, within convenient reach of levers L and G. The clutches F F are so constructed that the machine may be backed without reversing the motion of the gearing, and that when one wheel moves faster than the other, as in turning corners, the fastest wheel shall move the gearing.

Having thus described my invention, what I desire to claim, in this division of reissue, is—

The combination of the tongue-frame, vibrating on the main axle, and having the tongue rigidly connected thereto, the independently-vibrating cutter-frame, and the flexible draft-connection between said cutter-frame and the whiffletrees, substantially as described.

THOMAS N. FOSTER.

Witnesses:
L. T. LINNELL,
STOTON G. ROBINSON.